Patented June 23, 1931

1,811,587

UNITED STATES PATENT OFFICE

KARL P. McELROY, OF WASHINGTON, DISTRICT OF COLUMBIA, ASSIGNOR TO THE PERMUTIT COMPANY, OF NEW YORK, N. Y., A CORPORATION OF DELAWARE

PROCESS OF PURIFYING WATER

No Drawing.    Application filed March 1, 1929. Serial No. 343,851.

This invention relates to processes of purifying water; and it comprises a method of removing alkalinity from water particularly adapted for the treatment of zeolite softened water, wherein the water is percolated through a pervious bed of granular acid treated siliceous material; this bed when its activity ceases or lessens being regenerated by another treatment with an acid or an acid salt ($NaHSO_4$) to adapt it for re-use; all as more fully hereinafter set forth and as claimed.

Various methods of softening water by removal of lime and magnesia are known; the most efficient as regards total removal of these bases being those employing zeolites or base exchange silicates. No similar cheap and practicable method is however available for removing soluble alkaline compounds of sodium or of potassium. It is the object of the present invention to provide such a method.

In softening water by zeolitic processes, the hard water is percolated through a pervious granular bed of exchange silicates containing sodium. Several types of these silicates are in use. The silicates soften the water, abstracting lime and magnesia and giving up sodium in exchange. The sodium may go into solution as sulfate or carbonate or both according to the type of hardness in the water treated. After a time the silicates are regenerated with a solution of common salt (NaCl) when the reverse exchange takes place and the softening power of the silicates is regenerated.

Water can be softened in this way to zero-hardness, i. e., so that it gives no reaction with soap solution; and for most purposes the sodium it then contains is unobjectionable. For some objects however the presence of sodium, or of some forms of sodium compounds, is undesirable. For replenishing storage batteries, a water as free of mineral matter as distilled water is wanted. Some boiler users have a prejudice against the presence of sodium as carbonate or hydroxid while not objecting to the presence of sodium sulfate. In some cases, boiler users go to the extreme of adding sulfuric acid to zeolite treated waters to convert sodium carbonate and hydroxid to sulfate. This is an operation which requires correct measuring of the water to be treated, correct measuring of the acid to be added, and thorough mixing of the measured amount of acid with the measured amount of water, in order to avoid, at any time, excess of acid, all of which, of course, requires skillful work. The process does not remove the alkali, it merely changes it to sulfate.

The main object of the present invention is to provide a method of removing alkali from zeolite-softened water. In the case of hard waters not containing much sulfate, the final water produced after zeolitic softening followed by the treatment of the present invention, is substantially free of dissolved solids and may be used in the same relations as distilled water. The invention rests on a discovery that hydrated silica and silicate minerals which have been treated with acids in limited amounts are able to abstract a certain amount of soluble alkali from water, fixing it in insoluble form. When the adsorption of alkali slackens, the siliceous material may be regenerated for renewed use by treatment with acidulated water.

In the present method alkaline water to be freed of soluble alkali is passed through a pervious bed of granular acid-treated silica or silicates. Dissolved alkali is taken up from the water by the granules. After a time when the abstraction of alkali from the flowing water ceases or lessens substantially, the flow of water is shut off and the bed of mineral is regenerated by a treatment with acid and is rinsed with water whereupon the bed is ready for re-use.

A wide variety of forms of hydrated silica, natural and artificial, as well as of natural and artificial silicates may be used for my purpose. The power of adsorbing limited amounts of caustic or carbonated alkali is quite general and since the amount of alkali in zeolite treated water is always quite small, physical considerations in the material are usually as important as chemical. For use as a pervious bed, the material must exist as hard rigid granules within a certain range of sizes; and it must not disintegrate with acid. Generally speaking, high porosity is not very advantageous since while this increases the effective area and the capacity per cubic foot, surface in the form of fine pores requires more time for inward and outward passage of water and of regenerating liquid. The honeycomb type of coarse porosity found in pumice stone is better. Pumice stone itself is often useful for my purposes. The form or reactive $SiO_2$ existing naturally as flint can be used in this invention. Kieselguhr is chemically suitable but is too finely divided for use in most types of granular bed apparatus. Trap, granite, glass, slag and in fact any hard resistant rock or silicate material may be used, provided it will give up a little base to acid but will not break down into a mud. Baked clay granules are useful. The siliceous skeletons left on complete extraction of some minerals, such as glauconite, with acids are chemically suitable but are sometimes too friable for the present purposes. An incomplete extraction of glauconite, or of the various other materials used as zeolites in softening water, gives products better adapted for my purpose and gives high capacities. Extraction may be limited by the use of cold highly dilute acids, or of feeble acids such as acetic acid or $NaHSO_4$. As extraction requires time, with a brief period of contact fairly strong acid solutions may be used in extraction.

In using silicates, natural or artificial, it is generally better to carry the initial acid treatment merely far enough to remove the superficially occurring lime, magnesia or alkali; leaving the body of the mineral unattacked.

While, as stated, a wide variety of natural and artificial silicates may be employed, for general purposes, I regard baked clay granules as best since they can be given any desired shape, hardness, resistance to acid, porosity, etc.

It will be noted that the method as so far described is quite analogous to the ordinary water softening by zeolites in the sense that a pervious bed is provided and this is alternately used for treating water and for regeneration. However, instead of removing hardness it removes alkali and instead of regenerating with salt, regeneration is with acid. Any convenient dilute acid may be employed in regeneration. Usually sulfuric acid in dilute solution is employed; but with acid sensitive materials and where the presence of sodium sulfate in the water is wanted or is not objectionable, acid sodium sulfate or niter-cake is sometimes more advantageous. The present method however is not limited to the use of a granular bed apparatus since other ways of contacting the siliceous material and water may be used. Kieselguhr is useful where continuous feed and removal types of apparatus can be employed.

It will be further noted that the same result may be accomplished in the present invention as in adding sulfuric acid to zeolite treated water going to a boiler; but the sulfuric acid is added to stony material and then the stony material used for treating the water. The use of acid is indirect instead of direct and not so much care and precaution are necessary.

In an advantageous embodiment of my invention using baked clay granules for removing excess alkali from the effluent of zeolite softening apparatus, a pervious bed of granular material is treated by passing therethrough a dilute solution of sulfuric acid and then washing free of acid. Acid solutions as weak as 0.5 per cent sulfuric acid may be used. Alkali-containing water is now passed through the treated bed until the alkali begins to appear in the effluent whereupon passage of water to be treated is discontinued and the bed is regenerated by passing acid therethrough again. These alternations may be continued indefinitely.

In the described use of acid-treated silica and silicates for removing alkali, abstraction of sodium carbonate and caustic soda may be substantially complete without affecting sodium sulfate. In other words the present process can be used to remove the objectionable sodium compounds without removing those which are often deemed desirable.

While the present method may be employed for natural waters containing some sodium carbonate, such as are found in the West, I regard it better adapted for the treatment of zeolite treated water and in the best embodiment of my invention now known to me, a water treating apparatus under the present invention is used in series with an ordinary zeolite softener.

Water softened by the soda-lime process contains alkali which can be removed by the present process; best after a treatment to remove magnesia and calcium carbonate in colloid suspension. Clarified water from a lime-soda softener is subject to an "after reaction" depositing calcium or magnesium compounds; and this "after reaction" should be obviated before removal of alkali by the present process. The methods described in Kriegsheim 1,305,123 may be used.

What I claim is:—

1. The process of removing dissolved alkali from softened water containing dissolved sodium salts introduced in softening, which comprises dealkalizing such water by passing it through a pervious bed of granular, acid-treated, acid-resistant, siliceous material, then regenerating said material by passing an acid solution through said bed, washing the bed and repeating the cycle.

2. The process of removing dissolved alkali from softened water containing dissolved sodium salts introduced in softening, which comprises dealkalizing such water by passing it through a pervious bed of granular, baked clay, then regenerating said clay by passing an acid solution through said bed, washing the bed and repeating the cycle.

3. In the production of soft non-alkaline water for boiler purposes, the process which comprises passing a hard water through a zeolite softener to remove hardness-giving constituents and thereafter passing the effluent water through a pervious bed of granular acid-extracted siliceous material.

4. In the production of soft non-alkaline water for boiler purposes, the process which comprises passing a hard water through a zeolite softener to remove hardness-giving constituents and thereafter passing the effluent water through a pervious bed of acid extracted granular baked clay.

5. As an improvement in methods of softening water involving substitution of alkaline sodium compounds for calcium and magnesium compounds, the process which comprises passing such a softened water through a pervious bed of acid treated siliceous material adapted to take up and remove such alkaline sodium compounds.

6. The process of producing alkali-free softened water which comprises first treating a hard water with soda and lime to precipitate lime and magnesia therefrom and thereafter passing the softened water through a pervious bed of granular, acid treated, acid resistant siliceous material.

In testimony whereof, I have hereunto affixed my signature.

K. P. McELROY.